Figure 1:
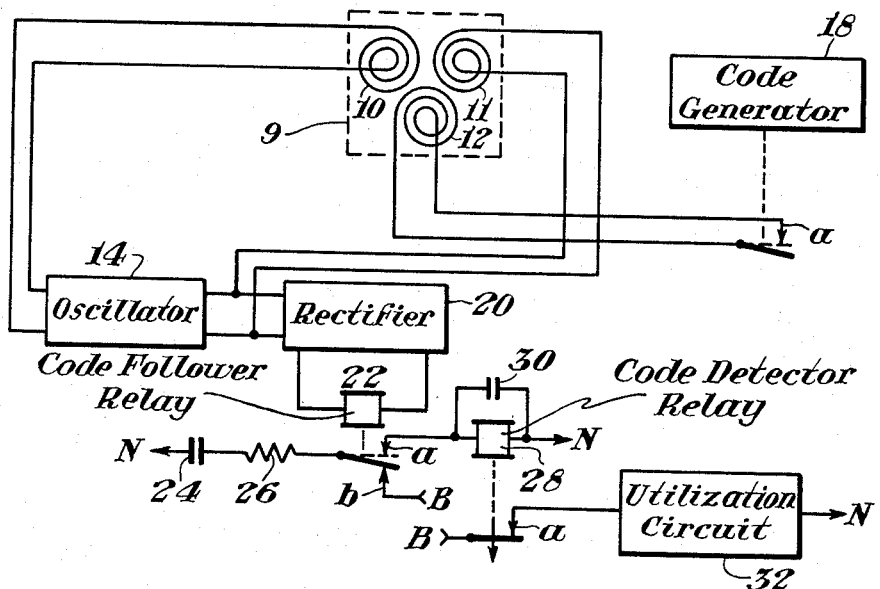

June 15, 1965 C. B. SHIELDS 3,189,885
CODED DETECTING SYSTEMS
Filed July 10, 1961

INVENTOR.
Charles B. Shields
BY
W. L. Stout
HIS ATTORNEY

United States Patent Office 3,189,885
Patented June 15, 1965

3,189,885
CODED DETECTING SYSTEMS
Charles B. Shields, Penn Hills Township, Allegheny County, Pa., assignor to Westinghouse Air Brake Company, Wilmerding, Pa., a corporation of Pennsylvania
Filed July 10, 1961, Ser. No. 123,062
9 Claims. (Cl. 340—258)

This invention relates to coded detecting systems and more particularly to coded detecting systems including code generating apparatus for providing a comprehensive check of objects or vehicles moving through a detection zone.

In the past there have frequently been employed in railway vehicle detecting systems mechanically actuated devices physically engaged by passing vehicles to indicate the presence of a car or train on a stretch of track. With progress in technology refinements in vehicle detecting devices have been rapid and one such device employs an arrangement which is influenced magnetically or inductively, thus precluding the necessity of operation by direct engagement with the body to be detected.

For example, one such vehicle detecting system is shown and described in the copending application for Letters Patent of the United States of Harold G. Witmer S.N. 15,622, filed March 17, 1960, and now abandoned, and assigned to the Westinghouse Air Brake Co., the assignee of the present application. In the system of the aforementioned application a pair of coils are arranged in a feedback circuit of an oscillator and are so oriented with respect to each other that normally there is insufficient feedback to cause oscillation. However, when a train passes over the coils a feedback path is completed whereupon the oscillator is made to oscillate. Such an arrangement wherein the oscillator is quiescent in the absence of a vehicle is based on the principle of open-circuit operation and is generally considered unfavorable, because defects in the system components may disable the system and render it non-responsive to passing trains until corrective steps are taken. A far more desirable mode of operation, as attained by this invention, is based on closed-circuit principles, since such a system is capable of detecting serious disorders in the apparatus which interfere with proper detection of the vehicles while also reliably detecting the presence of trains at other times.

An object of the present invention is to provide vehicle detecting apparatus in which operation on the closed-circuit principle is established whereby guarantee is afforded that the integrity of the system is undergoing a constant check.

Another object is the provision of a vehicle detecting system using an oscillator circuit wherein the integrity of the system is constantly checked by requiring the intermittent feedback of energy through coils forming a feedback path for the oscillator.

A vehicle detecting system illustrating features in accordance with the present invention embodies an oscillator and inductively coupled coils connected in a feedback circuit for the oscillator and arranged for having their coupling influenced by bodies or vehicles moving in a detection zone whereupon oscillation occurs. The inductive coupling between the coils additionally is influenced periodically by an inductance device alternately actuated to first and second states whereby the oscillator is made active intermittently. A utilization circuit is energized and deenergized in the absence and presence, respectively, of objects or vehicles, and is controlled by means for sensing the intermittent operation of the oscillator.

Figure 2:
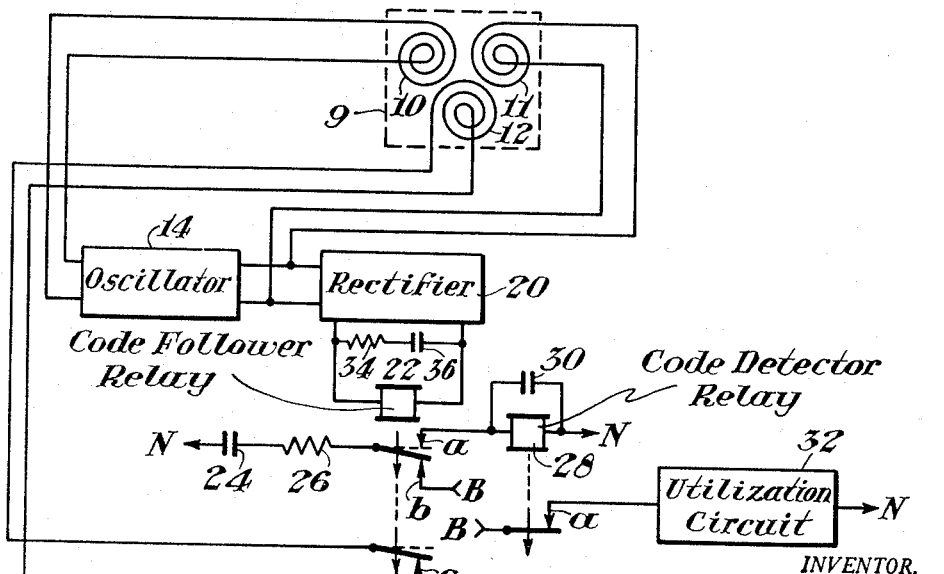

Other features, objects and advantages of the invention may be had from the following description when read in conjunction with the appended drawings, wherein:

FIG. 1 is a schematic representation illustrating one form of vehicle detecting system embodying my invention, and FIG. 2 is a schematic representation of an alternate form of vehicle detecting system embodying my invention.

I shall now describe both forms of the vehicle detecting system illustrative of my invention, and shall then point out the novel features thereof in the claims.

Referring now to FIG. 1, the system shown therein comprises an inductive coupling or vehicle detecting network 9 made up of three inductors identified, respectively, by the numerals 10, 11 and 12. The inductors 10 and 11 form a feedback circuit for a source of energy or oscillator 14, of conventional design, and thus represented herein in block diagram form. The inductors 10 and 11 are so oriented with respect to each other that zero or minimum inductive coupling occurs between them and there is insufficient feedback energy to oscillator 14 to cause oscillation. However, when continuity through the inductor 12 is made, a feedback path will be completed from inductor 11 to inductor 12 and then to inductor 10. When the value of the feedback energy to oscillator 14 becomes of sufficient magnitude, oscillation will occur. When a moving vehicle or object, identified herein by the reference numeral 16, moves into proximity with inductors 10 and 11, it likewise completes the feedback path whereupon oscillation again will occur.

Inductor 12 is alternately opened and short-circuited and, for this purpose, there is provided a source of coded signals such as a code generator 18 which may be any one of several well-known forms. It is sufficient for this application to point out that code generator 18 is provided with a contact member *a* which is actuated in a cyclic operation as long as the code generator is supplied with current from any suitable source.

The voltage appearing across the output of oscillator 14 when it is oscillating is applied to the terminals of a rectifier 20 of any usual type and, therefore, shown herein conventionally in block diagram form. The rectified output of rectifier 20 is then applied to the winding of a code follower relay 22.

The code follower relay 22 controls a frequency decoding circuit which may be of standard type, and herein shown as the condenser decoding type which includes a condenser 24, a resistor 26, and front and back contacts *a* and *b* respectively, of relay 22. The reference characters B and N designate the positive and negative terminals, respectively, of a suitable source of direct current such as a battery not shown.

In accordance with the usual practice, a code detector relay 28 is connected with the decoding circuit over front contact *a* of relay 22 and is effectively energized and retained energized only when relay 22 is operated above a predetermined code rate. Relay 28 is shunted by a condenser 30 to obtain slow release characteristics, as indicated by the downwardly directed arrow affixed to the operating element of this relay. Contact *a* of relay 28, when this relay is energized, is effective to complete the circuit for a utilization circuit 32, of any well-known type, which indicates the state of the circuit organization in accordance as it is energized or deenergized.

The operation of the system of FIG. 1 is as follows:

When the vehicle or object 16 is not near the position of the inductors 10 and 11, and code generator 18 is inoperative, neither of the above-mentioned feedback conditions prevails and there is insufficient coupling between the inductors 10 and 11 to cause oscillator 14 to oscillate. By placing code generator 18 into operation, front contact *a* controlled by the code generator operates, which alternately establishes continuity through inductor 12, and, in turn, causes intermittent oscillation to occur in oscillator 14. The intermittent rectified output which appears in output circuit of rectifier 20 is effective to alternately energize and deenergize relay 22.

With contact *b* of relay 22 closed, condenser 24 charges to a voltage determined by the potential provided between the battery terminals B and N. When relay 22 becomes energized, thus causing its front contact *a* to close, the voltage accumulated on condenser 24 is applied to the winding of the relay 28 and the condenser 30 in shunt therewith. Relay 28 thus becomes energized and will remain energized during the next release period of the relay 22 by virtue of the action of the condenser 30. Each time contact *a* of code generator 18 opens, oscillator 14 stops oscillating with the result that an output is no longer delivered by rectifier 20. Relay 22 thus deenergizes and closes its back contact *b* to recharge condenser 24. When the code generator 18 again becomes operative, relay 22 is once more energized whereupon the action is repeated. In this manner, a coding operation takes place with oscillator 14 becoming alternately operative and then inoperative as inductor 12 is short-circuited and opened, respectively. Thus, when no medium other than inductor 12 is influencing the inductors 10 and 11, relay 22 will continue its intermittent action, whereby the relay 28 will remain energized and indicate, by appropriate response of utilization circuit 32, the absence of the vehicle or object 16.

When, however, the vehicle or object 16 commences to influence inductors 10 and 11, its effect is to inductively couple inductors 10 and 11 until the end of the influencing. The net effect is that oscillator 14 oscillates continuously thereby interrupting the intermittent character of the current supplied to relay 22. Relay 22 therefore remains energized and its front contact *a* remains closed. Relay 28 will remain energized for a brief time as it is influenced by condenser 30 and will then become deenergized to interrupt the energizing circuit to utilization circuit 32 whereby the presence of the vehicle or object 16 is confirmed.

The illustrated circuit arrangement operates in accordance with the closed-circuit principle, since, if the intermittent action of relay 22 should cease when clear traffic conditions prevail relay 28 will become deenergized. Thus, the failure of any component prevents relay 28 from being held energized and results in the interruption of current to utilization circuit 32. In short, open connections in the circuit or defects causing short-circuiting of any of the elements in a manner other than the intentional intermittent discontinuous operation of inductor 12 will prevent relay 28 from responding to the coding action.

In the alternate form of my invention, shown in FIG. 2, the circuit obtains the coding feature adopted in the system of FIG. 1 while using one less component. Looking at FIG. 2, the inductors 10, 11 and 12 are oriented relative to each other in the manner described hereinabove so that when their degree of coupling is increased by the vehicle or object 16 the oscillator 14 commences to oscillate and remains excited until the end of the influencing. As shown in FIG. 2, however, the code generator 18 has been elminated. As a substitute to cause intermittent continuity and discontinuity of inductor 12, relay 22 is provided with an additional front contact *c* adapted to bridge the terminals of inductor 12.

In operation, with relay 22 deenergized, the circuit to the inductor 12 is closed which causes the oscillator to oscillate. In the previously described manner, this oscillation causes relay 22 to become energized. Contact *a* of relay 22 is now closed to provide an energizing current to relay 28, and contact *c* of relay 22 opens which in turn terminates the short-circuit condition of inductor 12. The removal of the short-circuit from inductor 12 causes oscillator 14 to become inactive whereupon relay 22 again becomes deenergized to cause the cycle of operation to repeat. Thus, with no vehicle or object influencing the coupling of inductors 10 and 11, relay 22 will operate intermittently in response to the code rate established by its own energization and deenergization. To control the speed at which relay 22 operates, and to provide it with slow release characteristics, a resistor-condenser network comprising the resistor 34 and condenser 36 is arranged in shunt with relay 22. Upon commencing of the influencing of inductors 10 and 11 by the vehicle or object 16, oscillator 14 will remain oscillating whereby relay 22 will become energized and remain energized. The continued energization of relay 22 will, as before, cause relay 28 to become deenergized after a specific length of time whereby the presence of the vehicle or object 16 will be detected.

The arrangement of FIG. 2 is particularly advantageous since the use of code generator 18 is no longer necessary because of the self-coding action which the system inherently provides. Furthermore, the illustrated embodiment of FIG. 2 provides the guarantee of a continuous check on the operation of the respective elements, since the destruction or inoperability of any of the elements will become manifest through the continuous deenergization of utilization circuit 32.

Although I have herein shown and described only two forms of apparatus embodying my invention, it is to be understood that various changes and modifications may be made therein within the scope of the appended claims without departing from the spirit and scope of my invention.

Having thus described my invention, what I claim is:

1. In a detecting system for detecting movable objects and having oscillating apparatus including feedback means located within a detection zone, said feedback means being ineffective normally to complete a return energy path to cause oscillation but being effective during interaction of the feedback means with objects to be detected to complete such return energy path and cause oscillation, the combination comprising, coding means operably associated with said feedback means for alternately completing such return energy path at a recurring rate whereby oscillation is made to occur intermittently, and decoding means responsive to the energy of such intermittent oscillation for translating said energy into intelligence indicative of the state of said system.

2. In a detecting system for detecting passing objects and having oscillating apparatus including feedback means disposed within a detection zone, said feedback means being effective normally to place said apparatus in a quiescent state but being effective during interaction of said feedback means with passing objects to return energy of a degree sufficient to cause oscillation which oscillation is continuous during such interaction, the combination comprising, coded means in control of said feedback means for actuating said feedback means alternately to increase the return energy to said degree of sufficiency whereby said oscillating apparatus oscillates intermittently at the code speed, a utilization circuit, and code detecting means for actuating said utilization circuit to a first and a second condition in accordance as said oscillating apparatus is and is not oscillating, respectively.

3. In a detecting system for detecting passing objects and having oscillating apparatus including a pair of inductively coupled feedback coils disposed in a detection zone and coupled normally to a degree insufficient to induce oscillation and having their coupling increased by passing objects to a degree sufficient to induce such oscillation, the combination comprising, a third inductive coil coded in cyclic fashion for alternately and independently of said objects modifying the coupling of said feed back coils in a manner characterized by alternate periods of oscillation in accordance with the code speed, and means for converting such intermittent oscillation energy into intelligence indicative of the state of said oscillating apparatus.

4. In a detecting system for detecting passing objects and having oscillating apparatus including a plurality of inductively coupled feedback coils disposed in a detection zone and coupled normally to a degree insufficient to induce oscillation and having their coupling increased by passing objects to a degree sufficient to induce such oscillation, the combination with said apparatus of, a coding device having a contact member alternately operated to a first and second position, inductance means alternately operated to a first and second condition in response to the respective positions of said contact member for actuating said feedback coils alternately to its normally coupled and increased coupling conditions, said oscillating apparatus being operative to create intermittent current impulses in response to the recurring coupling effects of said feedback coils, and code detecting means responsive to such current impulses for translating said impulses into decoded information indicative of the state of said oscillating apparatus.

5. A detecting system including an oscillator, a plurality of inductors located within a detection zone, said inductors connected in a feedback circuit for said oscillator and being so arranged that energy passes through said feedback circuit causing oscillation in response to the presence of objects in said zone, the degree of feedback in the absence of said objects from said zone being such that said oscillator is quiescent, inductance means for alternately increasing the coupling between said inductors at a recurring rate to place said oscillator intermittently in an oscillating condition in the absence of such objects from said zone, code follower means for reacting to the intermittent operation of said oscillator, and code detector means for detecting the code following operation of said code follower means.

6. A detecting system for objects traversing a detection zone and comprising, an oscillator, a plurality of inductors arranged in a return energy path for said oscillator and being so inductively coupled with each other that normally said oscillator is quiescent, said inductors being arranged in said detection zone and having their coupling increased by objects in the zone to a degree sufficient to induce oscillation in said oscillator, and inductor means for inductively coupling said first and second coils alternately at a recurring rate whereby the oscillation in said oscillator occurs at a corresponding rate.

7. A coded detecting system for registering the presence in or absence from a detection zone of an object, said system comprising an oscillator, inductive feedback means within the detection zone coupled with said oscillator and acted upon by an object in the zone for actuating said oscillator to produce continuous oscillations, coded feedback completing means coupled inductively with said inductive feedback means for actuating said oscillator during each code step to produce intermittent oscillations in the absence of an object from said zone, and decoding means responsive to the output of said oscillator for translating the character of the energy from said oscillator into intelligence indicative of the relation of objects to said inductive feedback means.

8. An object detecting system comprising first and second inductors disposed in a zone receiving objects to be detected and having their degree of coupling established at a first level in the absence of objects in said zone and established at an increased second level in response to the presence of said objects in said zone, circuit means for producing electrical oscillations including an input circuit coupled with said first inductor and an output circuit coupled with said second inductor, the first level of coupling being insufficient to cause said circuit means to oscillate, a third inductor disposed in said zone and arranged to be inductively coupled with said first and second inductors, coding means for alternately closing and opening the terminals of said third inductor whereby said first and second levels of coupling are periodically established to cause intermittent actuation of said circuit means, and code detecting apparatus responsive to the intermittent action of said circuit means.

9. An object detecting system for a detection zone comprising oscillating apparatus including first and second inductor means disposed within said detection zone constituting feedback means which is effective normally to place said oscillating apparatus in a first electrical state and is effective in response to interaction of said feedback means with objects in said zone to place said oscillating apparatus in a second electrical state, the combination comprising, a code follower relay responsive to the output of said oscillating apparatus and indicating the first and second electrical states thereof, a utilization circuit, a code detector circuit controlled by said code follower relay and coupled intermediate said code follower relay and said utilization circuit, a control circuit including a contact member of said code follower relay, and inductance means controlled by said contact member for inductively increasing the energy coupled through said feedback means to create alternately the second electrical state of said oscillating apparatus at a rate corresponding to the code rate of said code follower relay.

References Cited by the Examiner

UNITED STATES PATENTS

| 2,454,687 | 11/48 | Baughman. | |
|---|---|---|---|
| 2,537,298 | 1/51 | Baughman | 340—258 |
| 2,692,942 | 10/54 | Young | 246—28 |
| 2,753,550 | 7/56 | Treharne | 246—2 |
| 2,966,582 | 12/60 | Wachtel | 246—249 |
| 3,004,149 | 10/61 | Staples | 246—28 X |

LEO QUACKENBUSH, *Primary Examiner.*

LEO J. JEONING, *Examiner.*